US011139961B2

(12) United States Patent
Baracaldo Angel et al.

(10) Patent No.: US 11,139,961 B2
(45) Date of Patent: Oct. 5, 2021

(54) PRIVATE AND FEDERATED LEARNING

(71) Applicant: International Business Machines Corporation, Armonk, NY (US)

(72) Inventors: Nathalie Baracaldo Angel, San Jose, CA (US); Stacey Truex, Atlanta, GA (US); Heiko H. Ludwig, San Francisco, CA (US); Ali Anwar, San Jose, CA (US); Thomas Steinke, Mountain View, CA (US); Rui Zhang, San Francisco, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 16/405,066

(22) Filed: May 7, 2019

(65) Prior Publication Data
US 2020/0358599 A1 Nov. 12, 2020

(51) Int. Cl.
*H04L 29/06* (2006.01)
*H04L 9/08* (2006.01)
(Continued)

(52) U.S. Cl.
CPC .......... *H04L 9/085* (2013.01); *G06F 16/2471* (2019.01); *G06F 16/256* (2019.01);
(Continued)

(58) Field of Classification Search
None
See application file for complete search history.

(56) References Cited

U.S. PATENT DOCUMENTS 8,555,400 B2 * 10/2013 Shi .................. H04L 9/0833
726/26
8,661,047 B2 2/2014 Talwar et al.
(Continued)

OTHER PUBLICATIONS

Truex, Stacey, et al. "A Hybrid Approach to Privacy-Preserving Federated Learning." arXiv:submit/2501009 [cs.LG] Dec. 7, 2018. 9 pages.
(Continued)

*Primary Examiner* — Maung T Lwin
(74) *Attorney, Agent, or Firm* — Amin, Turocy & Watson, LLP

(57) ABSTRACT

Techniques regarding privacy preservation in a federated learning environment are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a plurality of machine learning components that can execute a machine learning algorithm to generate a plurality of model parameters. The computer executable components can also comprise an aggregator component that can synthesize a machine learning model based on an aggregate of the plurality of model parameters. The aggregator component can communicate with the plurality of machine learning components via a data privacy scheme that comprises a privacy process and a homomorphic encryption process in a federated learning environment.

17 Claims, 12 Drawing Sheets

(51) Int. Cl.
*H04L 9/00* (2006.01)
*G06F 21/62* (2013.01)
*G06N 20/20* (2019.01)
*G06F 16/25* (2019.01)
*G06F 16/2458* (2019.01)
*G06K 9/62* (2006.01)

(52) U.S. Cl.
CPC ....... *G06F 21/6227* (2013.01); *G06K 9/6257* (2013.01); *G06N 20/20* (2019.01); *H04L 9/008* (2013.01)

(56) References Cited

U.S. PATENT DOCUMENTS

| | | | |
|---|---|---|---|
| 10,504,154 B1* | 12/2019 | Bonawitz | H04L 9/008 |
| 10,621,164 B1* | 4/2020 | Kain | G06F 16/244 |
| 2011/0047389 A1* | 2/2011 | Ginter | G06Q 20/023 |
| | | | 713/194 |
| 2014/0281572 A1 | 9/2014 | Wang et al. | |
| 2017/0310483 A1 | 10/2017 | Nagao et al. | |
| 2018/0018590 A1* | 1/2018 | Szeto | G06F 21/6254 |
| 2018/0019866 A1 | 1/2018 | Kerschbaum | |
| 2018/0039619 A1 | 2/2018 | Thakurta et al. | |
| 2018/0181878 A1 | 6/2018 | Kasiviswanathan et al. | |
| 2018/0316502 A1 | 11/2018 | Nadeau et al. | |
| 2019/0147188 A1* | 5/2019 | Benaloh | H04L 63/0442 |
| | | | 726/26 |
| 2019/0149564 A1* | 5/2019 | McLean | H04L 63/1416 |
| | | | 713/171 |
| 2020/0218825 A1* | 7/2020 | Krishnamoorthy | G06N 3/08 |

OTHER PUBLICATIONS

Chang, Chih-Chung, et al. "LIBSVM: A Library for Support Vector Machines." ACM Transactions on Intelligent Systems and Technology, 2:27:1-27:27, 2011. 39 pages.

Lee, Jaewoo, et al. "Concentrated differentially private gradient descent with adaptive per-iteration privacy budget." KDD 2018—Proceedings of the 24th ACM SIGKDD International Conference on Knowledge Discovery and Data Mining (pp. 1656-1665). 10 pages.

Nasr, Milad, et al. "Comprehensive Privacy Analysis of Deep Learning." arXiv:1812.00910v1 [stat.ML] Dec. 3, 2018. 15 pages.

Mell, Peter, et al. "The NIST Definition of Cloud Computing." National Institute of Standards and Technology. Sep. 2011. 7 pages.

Truex, Stacey, et al. "A Hybrid Approach to Privacy-Preserving Federated Learning." TPDP 2018—Theory and Practice of Differential Privacy. Toronto, Canada—Oct. 15, 2018—part of CCS 2018. 1 page.

\* cited by examiner

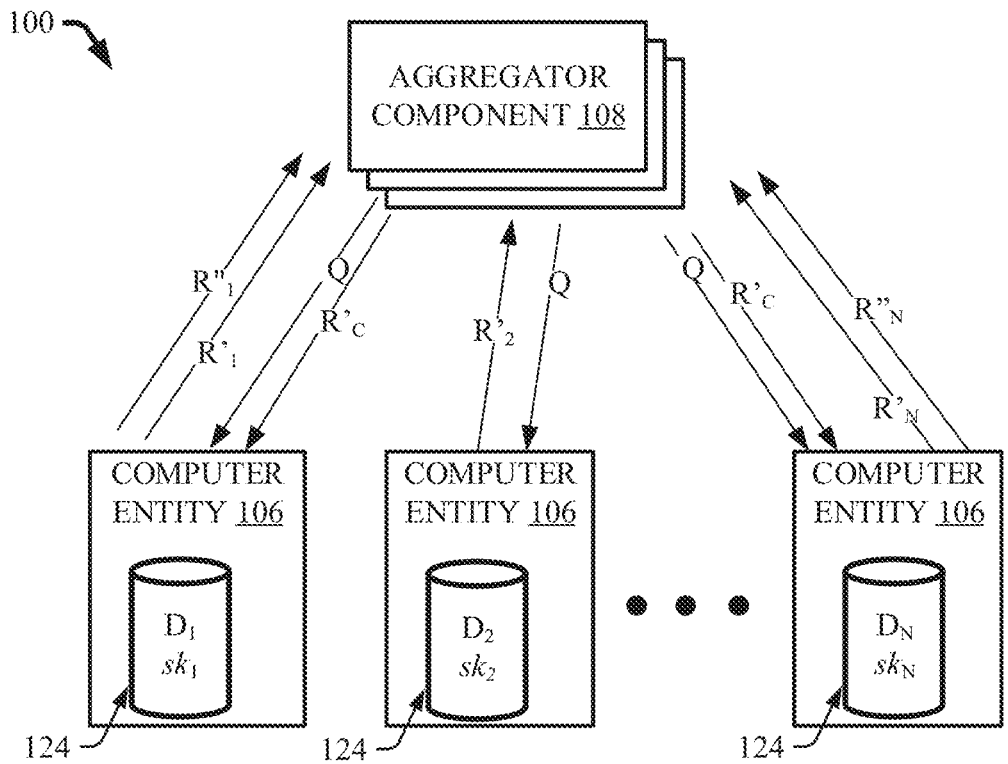

FIG. 6A

Algorithm 1 Private Federated Learning

Input: ML algorithm $f_M$; set of data parties $\mathcal{P}$ of size $n$, with each $P_i \in \mathcal{P}$ holding a private dataset $D_i$ and a portion of the secret key $sk_i$; minimum number of honest, non-colluding parties $t$; privacy guarantee $\epsilon$
$\bar{t} = n - t + 1$
for each $Q_s \in f_M$ do
  for each $P_i \in \mathcal{P}$ do
    $\mathcal{A}$ asynchronously queries $P_i$ with $Q_s$
    $r\_noisy_{i,s} = DP\_mechanism_{f_M}(Q_s, D_i, t, \epsilon_s)$
    $P_i$ sends $r_{i,s} = Enc_{pk}(r\_noisy_{i,s})$
  end for
  $\mathcal{A}$ aggregates $Enc_{pk}(r_s) \leftarrow r_{1,s} \circ r_{2,s} \circ ... \circ r_{n,s}$
  $\mathcal{A}$ selects $\mathcal{P}_{dec} \subseteq \mathcal{P}$ such that $|\mathcal{P}_{dec}| = \bar{t}$
  for each $P_i \in \mathcal{P}_{dec}$ do
    $\mathcal{A}$ asynchronously queries $P_i$ with $Enc_{pk}(r_s)$
    $\mathcal{A}$ receives partial decryption of $r_s$ from $P_i$ using $sk_i$
  end for
  $\mathcal{A}$ computes $r_s$ from partial decryptions
  $\mathcal{A}$ updates $M$ with $r_s$
end for
return $M$

FIG. 6B

PRIVATE AND FEDERATED LEARNING

BACKGROUND

The subject disclosure relates to private federated learning environments, and more specifically, using a data privacy scheme, which can comprise one or more privacy processes in a federate learning environment, to build a machine learning model.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can facilitate performing private federated learning are described.

According to an embodiment, a system is provided. The system can comprise a memory that stores computer executable components. The system can also comprise a processor, operably coupled to the memory, and that can execute the computer executable components stored in the memory. The computer executable components can comprise a plurality of machine learning components that can execute a machine learning algorithm to generate a plurality of model parameters. The computer executable components can also comprise an aggregator component that can synthesize a machine learning model based on an aggregate of the plurality of model parameters. The aggregator component can communicate with the plurality of machine learning components via a data privacy scheme that can comprise a privacy process and a homomorphic encryption process in a federated learning environment. An advantage of such a system can be the achievement of one or more privacy guarantees while incorporating a minimal amount of noise to the machine learning model.

In some examples, the privacy process can include at least one member selected from a group consisting of an anonymization process, a randomization process, a differential privacy process, a suppression process, and a generalization process. Also, the homomorphic encryption process can be a threshold variant homomorphic encryption process. An advantage of such a system can be the creation of federated learning environments with enhanced data privacy capabilities (e.g., as compared to conventional federated learning environments).

According to an embodiment, a computer-implemented method is provided. The computer-implemented method can comprise executing, by a system operatively coupled to a processor, a machine learning algorithm to generate a plurality of model parameters. The computer-implemented method can also comprise synthesizing, by the system, a machine learning model based on an aggregate of the plurality of model parameters via a data privacy scheme that can comprise a privacy process and a homomorphic encryption process in a federated learning environment. An advantage of such a computer-implemented method can be the use of a federated learning environment that can account for potential data inferences from individual participants.

In some examples, the computer-implemented method can further comprise generating, by the system, a plurality of queries regarding the machine learning algorithm. Also, the computer-implemented method can comprise communicating, by the system, the plurality of queries to a plurality of computer entities comprised within the federated learning environment. An advantage of such a computer-implemented method can be the incorporation of multiple datasets to create a large training data pool for construction of the machine learning model.

According to an embodiment, a computer program product for performing private federated learning is provided. The computer program product can comprise a computer readable storage medium having program instructions embodied therewith. The program instructions can be executable by a processor to cause the processor to execute, by a system operatively coupled to the processor, a machine learning algorithm to generate a plurality of model parameters. The program instructions can also cause the processor to synthesize, by the system, a machine learning model based on an aggregate of the plurality of model parameters via a data privacy scheme that can comprise a privacy process and a homomorphic encryption process in a federated learning environment. An advantage of such a computer program product can be the use of a federated learning environment that can account for the risk of collusion amongst the participating parties through a customizable trust parameter.

In some examples, the program instructions can further cause the processor to: generate, by the system, a plurality of queries regarding the machine learning algorithm; and communicate, by the system, the plurality of queries to a plurality of computer entities within the federated learning environment. Additionally, the computer program product can comprise second program instructions executable by a second processor operably coupled to the system to cause the second processor to generate, by the system, a model parameter from the plurality of model parameters as a response to a query from the plurality of queries. The second program instructions can also cause the second processor to modify, by the system, the response by implementing the privacy process to generate a modified response. Moreover, the second program instructions can cause the second processor to encrypt, by the system, the modified response by implementing the homomorphic encryption process to generate an encrypted response. An advantage of such a computer program product can be the implementation of a data privacy scheme that ensures privacy guarantees without creating excess noise in the final trained model.

BRIEF DESCRIPTION OF THE DRAWINGS

FIG. 6A illustrates a block diagram of an example, non-limiting communication scheme that can be implemented by one or more systems that can build one or more machine learning models in a private federated learning environment in accordance with one or more embodiments described herein.

FIG. 6B illustrates a diagram of an example, non-limiting scheme that can be executed by one or more systems to build one or more machine learning models in a private federated learning environment in accordance with one or more embodiments described herein.

DETAILED DESCRIPTION

Figure 1:
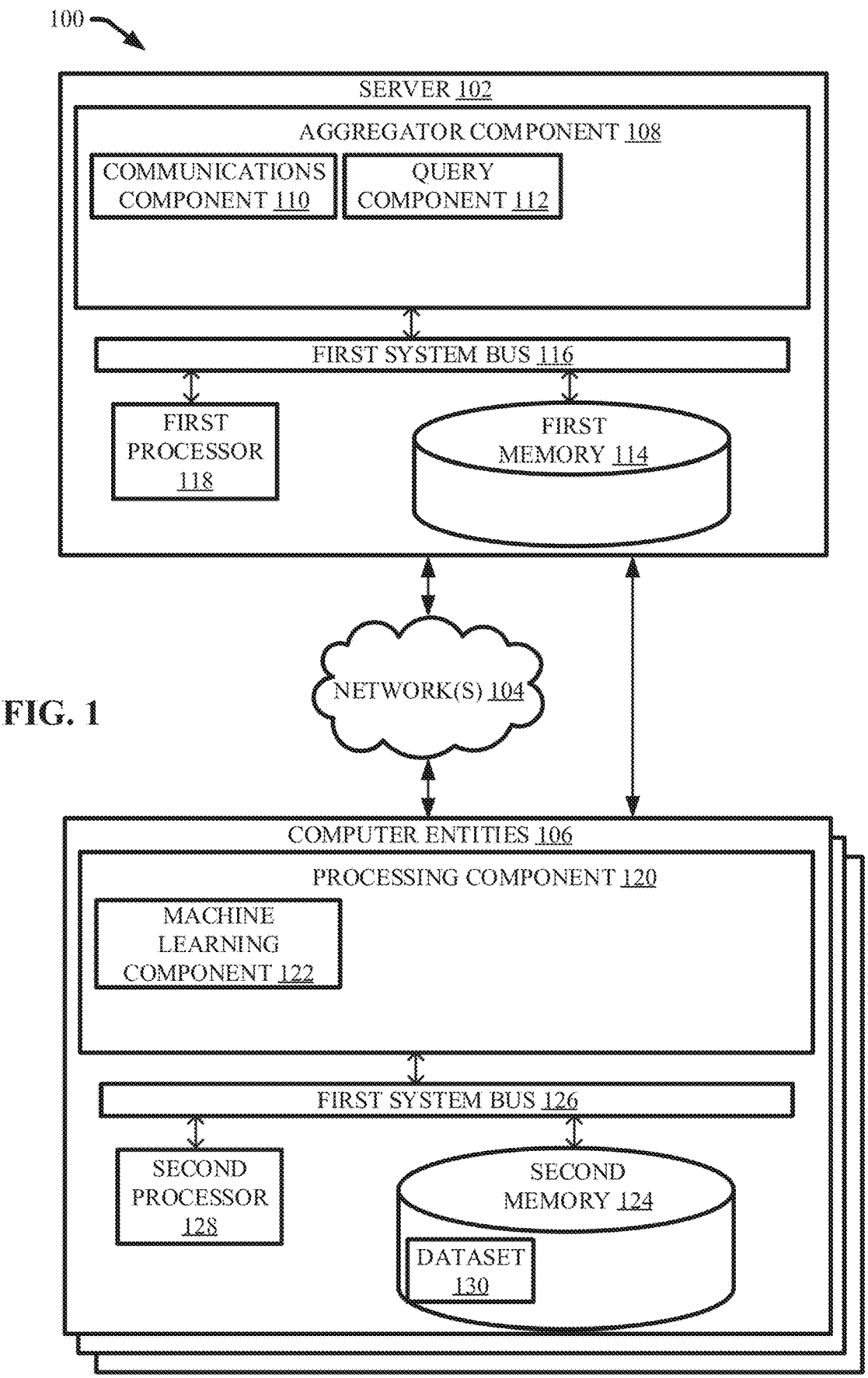
FIG. 1 illustrates a block diagram of an example, non-limiting system that can build one or more machine learning models in a private federated learning environment in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

In traditional machine learning environments, training data is centrally held by one organization executing a machine learning algorithm. Distributed learning systems extend this approach by using a set of learning components accessing shared data or having the data sent to the participating parties from a central party, all of which are fully trusted. For example, one approach to distributed learning is for a trusted central party to coordinate distributed learning processes to a machine learning model. Another approach is to use a parameter server. This again requires a fully trusted central party to distribute data among many additional parties and to collect and aggregate parameters learned by each party using their respective data shares.

However, some learning scenarios must address trust boundaries and/or applicable privacy legislation, particularly when multiple organizations or individuals are involved. Even though larger datasets improves the performance of trained models, organizations often cannot share data due to legal restrictions or competition between the organizations. The area of federated learning addresses these more restrictive environments by allowing data holders to collaborate throughout the learning process rather than requiring on a trusted third party to hold all of the data. Data holders in federated learning environments can run a machine learning algorithm locally and only exchange model parameters. Parameters are then aggregated and redistributed by one or more central entities.

However, federated learning environments have been proven to provide insufficient data privacy guarantees. To protect the privacy of the datasets, systems need to also consider inferences derived from the learning process and/or information that can be traced back to its source in the resulting trained model. To date, conventional attempts to ensure adequate data privacy guarantees in federated learning environments have resulted in poor predictive performance of the resulting model. For example, federated learning schemes using local differential privacy can result in the generation of an abundant amount of noise, which can deteriorate model performance.

Given the problems with conventional implementations of federated learning environments, the present disclosure can be implemented to produce a solution to one or more of these problems in the form of a data privacy scheme that can be executed in a federated learning environment and/or can reduce the degree of noise injection without sacrificing privacy and/or a pre-defined rate of trust. Advantageously, one or more embodiments described herein can provide strong privacy guarantees while enabling good machine learning model performance (e.g., as compared with conventional private federated learning techniques). Also, one or more embodiments described herein can advantageously account for potential inferences from individual participants in the federated learning environment as well as the risk of collusion amongst the participating parties through a customizable trust threshold. Furthermore, the various embodiments described herein can advantageously be used to train a variety of different machine learning model types.

Various embodiments of the present invention can be directed to computer processing systems, computer-implemented methods, apparatus and/or computer program products that facilitate the efficient, effective, and autonomous (e.g., without direct human guidance) preservation of data privacy in a federated learning environment. For example, one or more embodiments described herein can regard synthesizing a machine learning model based on data generated by a machine learning algorithm communicated across a plurality of machine learning components via a data privacy scheme that comprises one or more privacy processes and/or cryptography processes in a federated learning environment. For instance, the data privacy scheme can utilize a combination of secure multiparty computation and local differential privacy to ensure one or more privacy guarantees.

The computer processing systems, computer-implemented methods, apparatus and/or computer program products employ hardware and/or software to solve problems that are highly technical in nature (e.g., preserving data privacy in a federated learning environment), that are not abstract and cannot be performed as a set of mental acts by a human. For example, various embodiments include encryption and/or decryption processes that cannot be readily performed by the intellectual capacity of a human. Similarly, one or more embodiments include data manipulation, such as the incorporation of noise to model parameters, that cannot be readily performed by a human. Further, the autonomous nature of the various embodiments directly facilitates that the preservation of data privacy described herein.

As used herein, and exclusively for the purposes of this patent application, and any patent applications that may arise in this family of patent applications, the terms "machine learning algorithm" and/or "machine learning algorithms" can refer to one or more data analysis algorithms that can automatically build a mathematical model representative of one or more trends regarding input data. For instance, machine learning algorithms can comprise one or more artificial intelligence algorithms that can automatically and/or autonomously learn and/or improve from an experience (e.g., training data) without explicit programming of the lesson learned and/or improved. For example, machine learning algorithms can facilitate supervised and/or unsupervised learning to perform tasks such as classification, regression, identification, recognition, and/or clustering.

As used herein, the terms and exclusively for the purposes of this patent application, and any patent applications that may arise in this family of patent applications, "machine learning model" and/or machine learning models" can refer to one or more models that can comprise and/or present data collected by one or more machine learning algorithms, determinations made by one or more machine learning algorithms, and/or lessons learned from one or more machine learning algorithms. In various embodiments, machine learning models can be predictive models generated based on the execution of one or more machine learning algorithms. Example types of machine learning models can include, but are not limited to: decision tree models, neural network (e.g., convolution neural network) models, support vector machine ("SVM") models, random forest models, regression clustering (e.g., k-means) models, a combination thereof, and/or the like.

As used herein, and exclusively for the purposes of this patent application, and any patent applications that may arise in this family of patent applications, the terms "differential privacy process" and/or "differential privacy processes" can refer to one or more processes that can render an algorithm differentially private, wherein an algorithm can be described as differentially private if and only if the inclusion of a single instance in the training dataset causes only statistically insignificant changes to the algorithm's output. Differential privacy processes can place a theoretical limit on the influence of a single piece of data, thereby limiting a privacy adversary's ability to infer one or more characteristics of the data. For example, one or more differential privacy processes can add noise to an algorithm's output, wherein the added noise can be proportional to the sensitivity of the output and the sensitivity can measure the maximum change of the output due to the inclusion of a single data instance. Example differential privacy processes include the Laplacian and/or Gaussian mechanisms. Wherein multiple differential privacy processes are utilized to achieve differential privacy, the evaluation of a privacy guarantee can follow from the basic composition theorem or from advanced composition theorems and/or their extensions.

As used herein, and exclusively for the purposes of this patent application, and any patent applications that may arise in this family of patent applications, the terms "threshold variant homomorphic encryption process" and/or "threshold variant homomorphic encryption processes" can refer to one or more variants of one or more additive homomorphic encryptions, which can enable untrusted parties to perform operations on encrypted values. An example additive homomorphic encryption can be the Paillier cryptosystem. An example threshold variant homomorphic encryption process can be a variant of the Paillier cryptosystem in which a set of participants is able to share a secret decryption key such that no set of parties smaller than a pre-defined threshold is able to decrypt encrypted data.

As used herein, and exclusively for the purposes of this patent application, and any patent applications that may arise in this family of patent applications, the term "privacy of computation" can refer to preserving data privacy within the computation of an algorithm. For example, preserving the privacy of data comprised within a response to a machine learning algorithm's query. For instance, privacy of computation can be achieved using one or more secure multiparty computation protocols, which can allow N parties (e.g., wherein "N" is the number of parties) to obtain the output of a function over their N inputs while preventing knowledge of anything other than the output. While no knowledge can be gained through analysis of the communication or intermediate results revealed through the execution of one or more secure multiparty computation protocols, the output remains unchanged from the output of the function execution when all data is explicitly shared by the N parties.

As used herein, and exclusively for the purposes of this patent application, and any patent applications that may arise in this family of patent applications, the term "privacy of output" can refer to preserving the privacy of one or more intermediate outputs of an algorithm (e.g., a machine learning algorithm) that are available to participants as well as the model being built by the algorithm. For example, privacy of output can ensure that participants and/or outsiders to a data privacy scheme cannot infer information regarding data of another participant from the one or more outputs of the algorithm.

As used herein, and exclusively for the purposes of this patent application, and any patent applications that may arise in this family of patent applications, the terms "honest-but-curios adversary" and/or "honest-but curious adversaries" can refer to one or more adversaries to the privacy of a dataset, in which the one or more adversaries follow the protocols of a data privacy scheme correctly but nevertheless attempt to learn additional information (e.g., not directly disclosed and/or not intentionally disclosed). For example, honest-but-curious adversaries can attempt to infer private information from disclosed data (e.g., data output by one or more machine learning algorithms).

As used herein, and exclusively for the purposes of this patent application, and any patent applications that may arise in this family of patent applications, the term "colluding parties" can refer to parties comprised within a federated learning environment that share data and/or information regarding data. For example, colluding parties can be co-owned by a governing entity and/or can be separate entities benefiting from cooperation towards a common goal. In contrast, as used herein the term "non-colluding parties" can refer to parties comprised within a federated learning environment that do not share data and/or information regarding data. For example, non-colluding parties can be interested in preserving the privacy of their respective data against disclosure to other parties participating in the federated learning environment.

As used herein, and exclusively for the purposes of this patent application, and any patent applications that may arise in this family of patent applications, the terms "outside party" and/or "outside parties" can refer to one or more entities that are not included in the federated learning environment. For example, one or more outside parties can include entities that are not sharing data within the federated learning environment. Also, outside parties can include entities that are not authorized to perform one or more computations within a subject federated learning environment.

FIG. 1 illustrates a block diagram of an example, non-limiting system 100 that can preserve data privacy in a federated learning environment. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines, e.g., embodied in one or more computer readable mediums (or media) associated with one or more machines. Such components, when executed by the one or more machines, e.g., computers, computing devices, virtual machines, etc. can cause the machines to perform the operations described.

As shown in FIG. 1, the system 100 can comprise one or more servers 102, one or more networks 104, and/or one or more computer entities 106. The server 102 can comprise aggregator component 108. The aggregator component 108 can further comprise communications component 110 and/or query component 112. Also, the server 102 can comprise or otherwise be associated with at least one first memories 114. The server 102 can further comprise a first system bus 116 that can couple to various components such as, but not limited to, the aggregator component 108 and associated components, first memory 114 and/or a first processor 118. While a server 102 is illustrated in FIG. 1, in other embodiments, multiple devices of various types can be associated with or comprise the features shown in FIG. 1. Further, the server 102 can communicate with one or more cloud computing environments (e.g., via the one or more networks 104).

The one or more networks 104 can comprise wired and wireless networks, including, but not limited to, a cellular network, a wide area network (WAN) (e.g., the Internet) or a local area network (LAN). For example, the server 102 can communicate with the one or more computer entities 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the aggregator component 108 can be provided on the one or more servers 102, it should be appreciated that the architecture of system 100 is not so limited. For example, the aggregator component 108, or one or more components of aggregator component 108, can be located at another computer device, such as another server device, a client device, etc.

As shown in FIG. 1, the one or more computer entities 106 can comprise processing component 120. The processing component 120 can further comprise machine learning component 122. Also, the one or more computer entities 106 can comprise or otherwise be associated with at least one second memories 124. The one or more computer entities 106 can further comprise a second system bus 126 that can couple to various components such as, but not limited to, the processing component 120 and associated components, second memory 124 and/or a second processor 128. Further, the server 102 can communicate with one or more cloud computing environments (e.g., via the one or more networks 104).

The system 100 can facilitate a federated learning environment in which the one or more computer entities 106 can be one or more parties participating in the federated learning environment. In various embodiments, a user of the system 100 can enter (e.g., via the one or more networks 104) into the system 100 a machine learning algorithm (e.g., represented herein by "$f_M$"), a privacy guarantee value (e.g., represented herein by "∈") against inference, and/or a trust parameter (e.g., represented herein by "t") that can delineate the minimum number of honest, non-colluding parties within the federated learning environment. In one or more embodiments, the aggregator component 108 can receive the machine learning algorithm (e.g., via the one or more networks 104) and execute the machine learning algorithm in conjunction with the one or more computer entities 106 and/or in accordance with the privacy guarantee. For example, the aggregator component 108 can implement a data privacy scheme within the federated learning environment facilitated by the system 100 that can ensure privacy of computation, privacy of outputs, and/or trust amongst participating parties.

In one or more embodiments, the communications component 110 can receive one or more inputs from a user of the system 100. For example, the communications component 110 can receive one or more machine learning algorithms. Further, the communications component 110 can share one or more of the inputs with various associated components of the aggregator component 108. In one or more embodiments, the communications component 110 can also share the one or more inputs with the plurality of computer entities 106. For example, the communications component 110 can share a received machine learning algorithm, or a part of a machine learning algorithm, with the one or more computer entities 106.

In various embodiments, the aggregator component 108 can execute a received machine learning algorithm to generate a machine learning model, wherein the machine learning model can be trained based on data held by the one or more computer entities 106. For example, the query component 112 can generate one or more queries based on the received machine learning algorithm. For instance, each query can be a linear query requiring information from respective datasets 130 held and/or managed by the computer entities 106. In another embodiment, a query can request the computation of gradients based on a provided initial model. The one or more queries can request information required by the machine learning algorithm for construction of the machine learning model. Further, the one or more queries generated by the query component 112 can be sent to the one or more computer entities 106 via the communications component 110 (e.g., through one or more secure channels of the one or more networks 104). For example, the query component 112 can generate a first query and/or a second query, wherein the first query can be sent to a first computer entity 106 and/or the second query can be sent to a second computer entity 106. The first query and the second query can be the same or different. Further, a plurality of queries can be generated by the query component 112 and sent by the communications component 110 to the same computer entity 106.

Each computer entity 106 comprised within the system 100 can comprise the processing component 120, which can receive one or more of the queries generated by the query component 112. Further, the one or more processing components 120 can comprise one or more machine learning components 122, as shown in FIG. 1. The one or more machine learning components 122 can generate one or more responses to the one or more received queries based on the dataset 130 respectively held and/or managed by the subject computer entity 106. For example, a first computer entity 106 can comprise a machine learning component 122 that can generate one or more responses based on a first dataset 130 held and/or managed by the first computer entity 106; while a second computer entity 106 can comprise another machine learning component 122 that can generate one or more other responses based on a second dataset 130 held and/or managed by the second computer entity 106. Further, the first dataset 130 and the second dataset 130 can comprise different training data. In various embodiments, the one or more machine learning components 122 can generate the one or more responses in accordance with the machine learning algorithm or a portion of the machine learning algorithm.

In one or more embodiments, one or more of the computer entities 106 can be colluding parties and/or one or more of the computer entities 106 can be non-colluding parties. For example, one or more computer entities 106 can be non-colluding parties that hold and/or manage their respective datasets 130 privately without sharing the content of the datasets 130 with one or more other computer entities 106. In another example, one or more computer entities 106 can be colluding parties that share the content, or partial content, of their respective datasets 130 with other colluding computer entities 106.

As shown in FIG. 1, the datasets 130 can be stored within the second memories 124 of the computer entities 106. The data comprised within the datasets 130 can be used to train one or more machine learning models that can be synthesized by the aggregator component 108 based on the machine learning algorithm. To ensure privacy of the training data, the training data can remain stored within the datasets 130 and/or held and/or managed by the respective computer entities 106 throughout the various processes and/or computations of the system 100. Thereby, non-colluding parties within the federated learning environment can be unable to review, analyze, and/or manipulate the training data comprised within a dataset 130 not held and/or managed by the subject computer entity 106. For example, a first computer entity 106 can be unable to review, analyze, and/or manipulate the training data comprised within the dataset 130 of a second computer entity 106. Further, to ensure privacy of computation, the generation of responses can be performed privately by the one or more machine learning components 122. For example, a first computer entity 106 can be unable to review, analyze, and/or manipulate the one or more responses generated by the machine learning component 122 of a second computer entity 106. Thereby, for instance, the training data, computations, and/or generated responses performed by the computer entities 106 can be private from the other computer entities 106 within the federated learning environment. In another instance, a first computer entity 106 can share training data, computations, and/or generated responses with one or more colluding computer entities 106; whereas the first computer entity 106 can hold private training data, computations, and/or generated responses from non-colluding computer entities 106.

Figure 2:
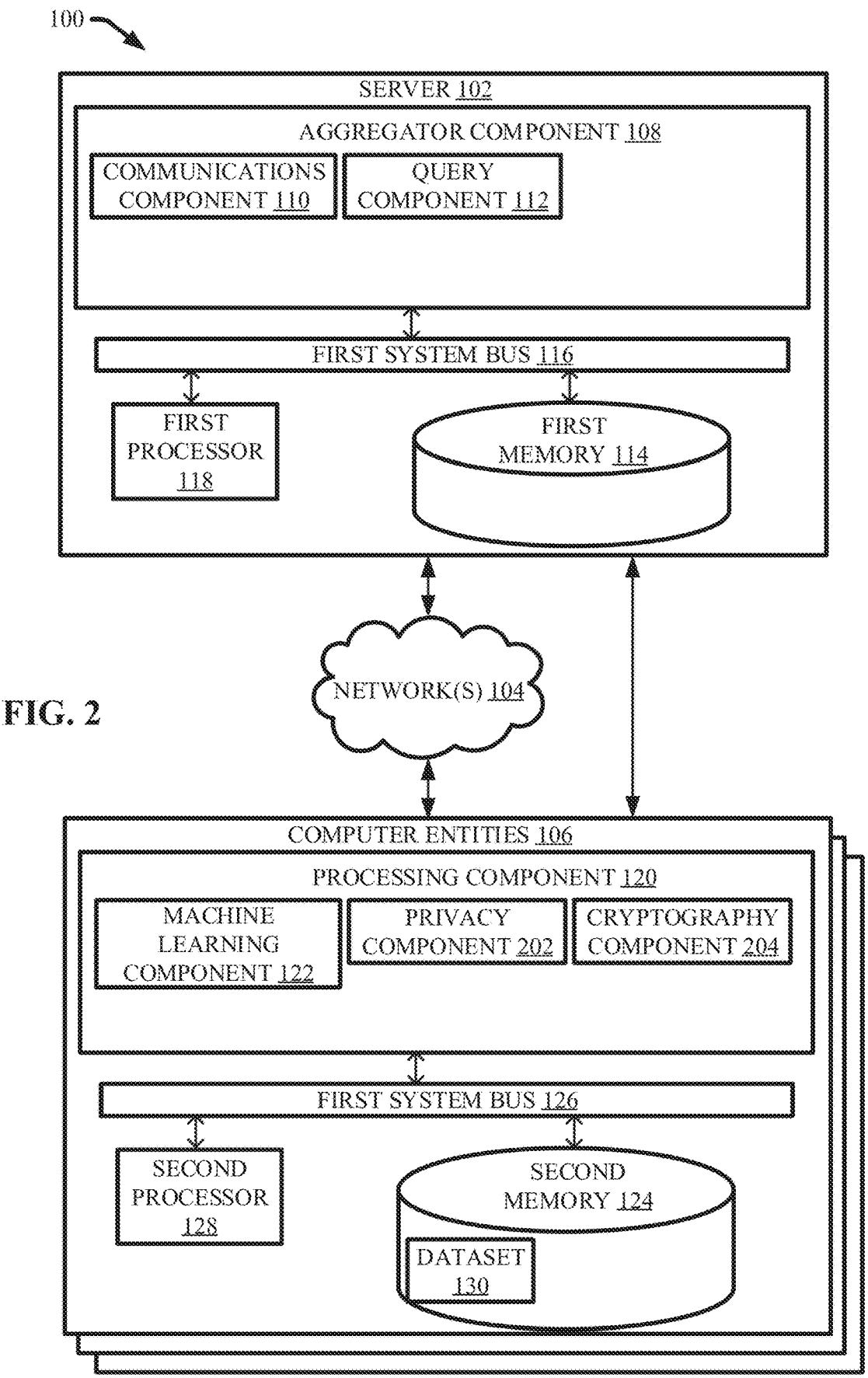
FIG. 2 illustrates a block diagram of an example, non-limiting system that can implement one or more privacy processes to protect data shared in a federated learning environment in accordance with one or more embodiments described herein.

FIG. 2 illustrates a diagram of the example, non-limiting system 100 further comprising privacy component 202 and/or cryptography component 204 in accordance with one or more embodiments described herein. Repetitive description of like elements employed in other embodiments described herein is omitted for sake of brevity. To help ensure privacy of output (e.g., amongst the participants of the federated learning environment and outside parties), the one or more computer entities 106 can further implement one or more data privacy schemes comprising one or more privacy processes and/or cryptography processes to protect the content of the responses (e.g., from analysis, review, and/or inference), and thereby the content of the datasets 130.

The privacy component 202 can modify the one or more generated responses to generate one or more modified responses. For example, the privacy component 202 can modify the one or more generated responses via one or more privacy processes. Example privacy processes can include, but are not limited to: an anonymization process, a randomization process, a differential privacy process, a suppression process, a generalization process, a combination thereof, and/or the like. In various embodiments, the privacy component 202 can implement one or more differential privacy processes to modify the one or more generated responses. For instance, the privacy component 202 can use one or more differential privacy processes to add an appropriate amount of noise to the one or more generated responses according to: the privacy guarantee value (e.g., represented by "E" and/or set by a user of the system 100), a trust parameter (e.g., a number of the non-colluding parties, which can be represented by "t" and/or set by a user of the system 100), and/or the number of generated queries.

In various embodiments, the overall amount of noise (e.g., represented herein by "noise") added (e.g., to the one or more generated responses) by the one or more privacy components 202 can be dependent on the privacy guarantee value provided by a user of the system 100 (e.g., via the one or more networks 104). For example, for the data privacy scheme to achieve differential privacy, the overall amount of added noise can be inversely proportional to the privacy guarantee value ("∈"). For instance, as the privacy guarantee value decreases, the suspected amount of collusion within federated learning environment can increase; thereby, the overall amount of noise added can also increase to help combat the collusion. Thus, as the privacy guarantee value decreases, the overall amount of added noise can increase.

Also, the amount of noise added to the system 100 by the one or more privacy components 202 can be split amongst the various modified responses generated by the various computer entities 106. For example, as the number of parties in the federated learning environment increases (e.g., the number of computer entities 106), the amount of noise added to each response can decrease. For instance, the one or more modified responses generated by the privacy component 202 can be characterized by Equation 1 below.

$$R_M = R + N\left(0, S^2 \frac{\sigma^2}{N-1}\right) \quad (1)$$

Wherein "$R_M$" can represent a modified response generated by the privacy component 202 using the Gaussian mechanism, "R" can represent a response generated by the one or more machine learning components 122, "S" can represent a sensitivity of the query to which R is the response, "σ" can represent a noise parameter for the query, and/or "N" can be the number of parties in the system 100 (e.g., the number of computer entities 106). In one or more embodiments, the one or more queries can be characterized by a sensitivity ("S"), which can measure the maximum change of the output due to the inclusion of a single data instance.

In one or more embodiments, the one or more privacy processes implemented by the privacy component 202 can exhibit further resilience to collusion amongst parties of the federated learning environment. For example, the privacy component 202 can utilize one or more differential privacy processes in which the amount of added noise can be split amongst the non-colluding parties. For instance, the one or more modified responses generated by the privacy component 202 can be characterized by Equation 2 below.

$$R_M = R + N\left(0, S^2 \frac{\sigma^2}{t-1}\right) \quad (2)$$

Wherein "t" can be the minimum number of non-colluding parties (e.g., which can be provided by a user of the system 100 as described herein).

Additionally, in some embodiments the privacy component 202 can modify the one or more datasets 130 of the computer entity 106 prior to generation of the one or more responses by the one or more machine learning components 122. Thereby, the one or more privacy measures can be incorporated into the generated responses via modifications to the training data. For example, the privacy component 202 can implement one or more differential privacy processes to add noise to the subject dataset 130 prior to computation of the one or more responses. The amount of noise added to the dataset 130 can be dependent on the privacy guarantee, a trust parameter (e.g., a number of the non-colluding parties), and/or the number of generated queries. For instance, the amount of noise added to the dataset 130 can be dependent on the number of parties and/or non-colluding parties in the federated learning environment, as described herein.

The cryptography component 204 can further facilitate a privacy of output by encrypting the one or more modified responses and/or the one or more responses generated from a modified dataset (e.g., wherein the privacy component 202 implements one or more privacy processes prior to generation of the one or more responses). In various embodiments, the encryption performed by the cryptography component 204 can enable the privacy component 202 to add less noise to the one or more generated responses and/or datasets 130 that otherwise necessitated by conventional federated learning privacy schemes. Thereby, the one or more computer entities 106 can implement a data privacy scheme that comprises a hybridization of privacy processes (e.g., differential privacy processes) and cryptography processes (e.g., encryption processes) to achieve a data privacy scheme that can facilitate privacy of computation and/or privacy of output (e.g., while minimizing the addition of noise to the system 100).

Figure 3:
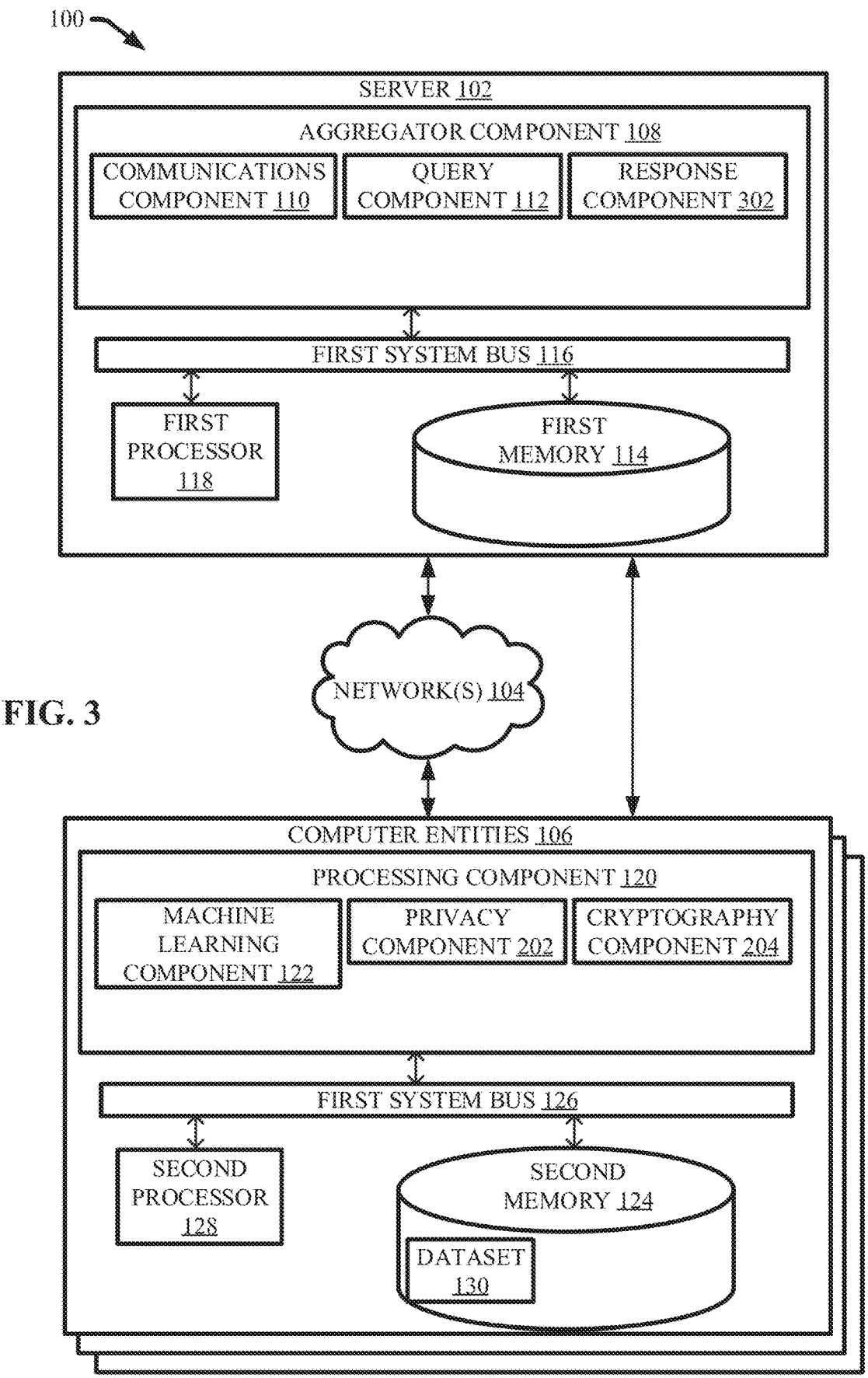
FIG. 3 illustrates a block diagram of an example, non-limiting system that can aggregate encrypted data in a private federated learning environment in accordance with one or more embodiments described herein.

FIG. 3 illustrates a diagram of the example, non-limiting system 100 further comprising response component 302 in accordance with one or more embodiments described herein. Repetitive description of like elements employed in other embodiments described herein is omitted for sake of brevity. As shown in FIG. 3, the aggregator component 108 can further comprise a response component 302.

In various embodiments, the one or more computer entities 106 can send (e.g., via a secure connection of the one or more networks 104) the one or more encrypted modified responses to the aggregator component 108. The communications component 110 can receive the one or more encrypted modified responses and share the one or more encrypted modified responses with the response component 302. The response component 302 can analyze the one or more encrypted modified responses and/or initiate an additional cryptographic process to further ensure privacy of computation and/or output. For example, the response component 302 can initiate one or more threshold variant homomorphic encryption processes with regards to the one or more encrypted modified responses generated by the one or more computer entities 106.

For instance, homomorphic properties of the one or more encrypted modified responses can allow the response component 302 to aggregate the encrypted modified responses to generate an encrypted response composition. Thereby, in one or more embodiments the response component 302 can generated an encrypted response composition that can be an aggregated of encrypted responses to the one or more queries. Further, the encrypted response composition can inherently include the composition of the modifications (e.g., noise) added by the one or more privacy processes implemented by the respective computer entities 106, thereby guaranteeing that the unmodified responses are not exposed.

Moreover, the level of trust in the system 100 can be further enhanced by depriving the aggregator component 108 the ability to decrypt the encrypted modified responses and/or the encrypted response composition. Rather, the response component 302 can query a plurality of the computer entities 106 to decrypt respective pieces of the encrypted response composition. Thereby, neither the aggregator component 108 nor an individual computer entity 106 can unilaterally decrypt the entirety of the noisy aggregated responses. For example, a threshold setting can define the number of computer entities 106 queried by the response component 302 to decrypt the encrypted response composition. The threshold setting can be equal to or greater than N−t+1, wherein "N" can represent the number of computer entities 106 in the system 100 and/or "t" can represent the number of non-colluding computer entities 106. In one or more embodiments, users of the system 100 can define the threshold setting via the one or more networks 104.

Wherein the response component 302 implements a threshold variant homomorphic encryption process, the amount of noise added to each response by the privacy components 202 can be further reduced. For instance, wherein the threshold setting is equal to N−t+1, the added noise can be reduced by a factor of t−1. Since t−1<N, the added noise is greater than that required to achieve differential privacy. Additionally, the threshold variant homomorphic encryption process can ensure that the maximum number of colluders cannot decrypt the values of honest parties.

Figure 4:
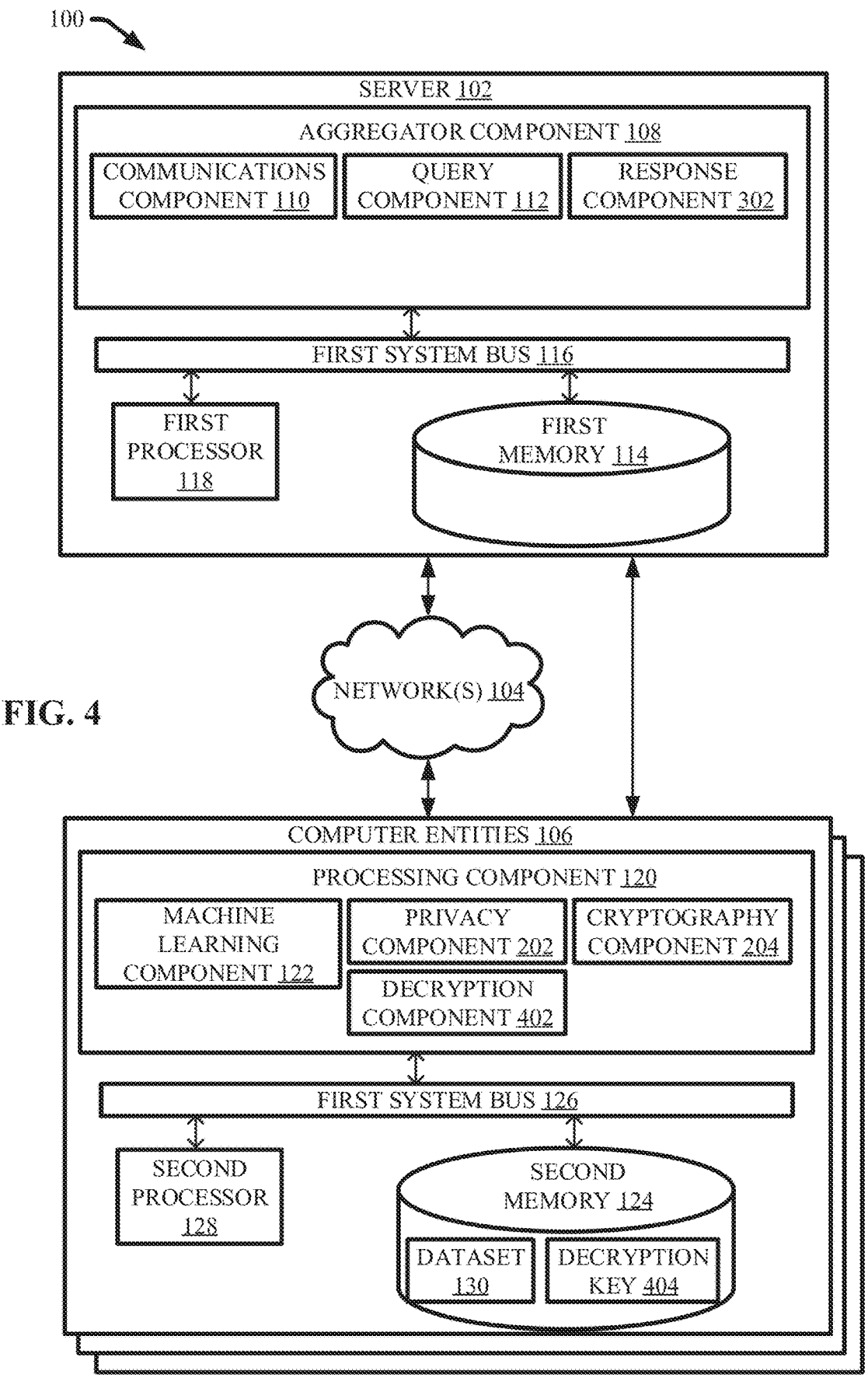
FIG. 4 illustrates a block diagram of an example, non-limiting system that can decrypt encrypted data aggregations while maintaining data privacy in accordance with one or more embodiments described herein.

FIG. 4 illustrates a diagram of the example, non-limiting system 100 further comprising decryption component 402 in accordance with one or more embodiments described herein. Repetitive description of like elements employed in other embodiments described herein is omitted for sake of brevity. As shown in FIG. 4, the one or more processing components 120 can further comprise a decryption component 402.

In various embodiments, aggregator component 108 (e.g., via the communications component 110 and/or the response component 302) can send (e.g., via a secure connection of the one or more networks 104) the encrypted response composition, or a portion of the encrypted response composition, to the computer entities 106 queried for the decryption process. As shown in FIG. 4, the one or more computer entities 106 can further hold one or more decryption keys 404 (e.g., stored in the one or more second memories 126). The one or more decryption keys 404 can be secret keys held in confidence by the computer entities 106. Each of the decryption keys 404 can correspond to a respective portion of the encrypted response composition.

The one or more decryption components 402 can utilize the associate decryption key 404 (e.g., in combination with a public decryption key) to decrypt a portion of the encrypted response composition. Thereby, each decryption component 402 of the system 100 can partially decrypt the entire encrypted response composition. At the beginning of the federated learning process, in accordance with the trust parameter ("t"), 1 public key and N private decryption keys 404 can be generated (e.g., via the response component 302) and distributed to each of the N parties. The decryption keys 404 can be generated such that any t≤N decryption keys 404 can be used to successfully decrypt any message which was encrypted using the public key. Each decryption key 404 can be used independently to generate a share of the decrypted result and therefore need not be revealed during the decryption process. However, if fewer than t shares of the decryption result are generated (i.e. fewer than t private decryption keys 404 are used), then the message cannot be decrypted. In one or more embodiments, decryption keys 404 can be generated and/or distributed as part of the formation of the federated learning environment. For example, each decryption component 402 can partially decrypt with its decryption key 404 the encrypted response composition that corresponds to the decryption key 404 associated with the respective decryption component 402 (e.g., the decryption key comprised within the same computer entity 106 as the subject decryption component 402).

Figure 5:
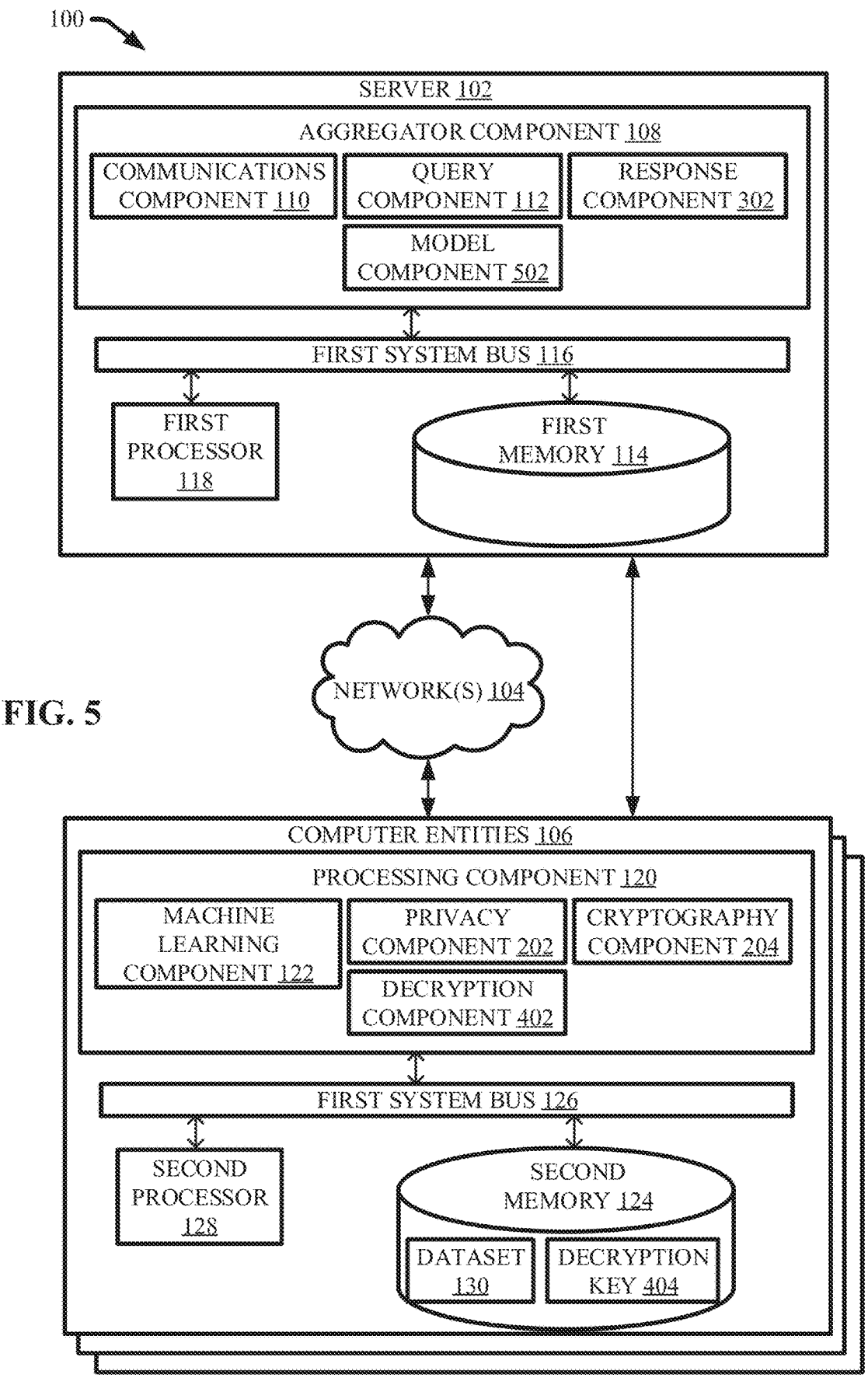
FIG. 5 illustrates a block diagram of an example, non-limiting system that can building one or more machine learning models in a private federated learning environment in accordance with one or more embodiments described herein.

FIG. 5 illustrates a diagram of the example, non-limiting system 100 further comprising model component 502 in accordance with one or more embodiments described herein. Repetitive description of like elements employed in other embodiments described herein is omitted for sake of brevity.

As shown in FIG. 5, the aggregator component 108 can further comprise a model component 502.

In various embodiments, the one or more computer entities 106 can send (e.g., via a secure connection of the one or more networks 104) the one or more decrypted portions of the encrypted response composition to the aggregator component 108. The communications component 110 can receive the one or more decrypted portions and share the one or more decrypted portions with the model component 502. The model component 502 can thereby utilize the data comprised within the decrypted portions to synthesize and/or train a machine learning model. Example types of machine learning models that can be synthesized and/or trained by the model component 502 can include, but are not limited to: decision tree models, neural network models (e.g., convolutional neural network models), SVM models, random forest models, regression models, clustering models, a combination thereof, and/or the like.

Advantageously, the data privacy scheme implemented by the system 100 (e.g., via the one or more privacy components 202, cryptography components 204, response components 302, and/or decryption components 402) can consider trust with respect to collusion with regards to the amount of added noise and/or the threshold setting of the encryption scheme. For example, the more computer entities 106 colluding, the more knowledge that is available to infer data held and/or managed by another, non-colluding computer entity 106. In various embodiments described herein, the noise introduced by a non-colluding computer entity 106 can account for collusion. Additionally, the use of homomorphic encryption can allow for significant increases in accuracy of the resulting machine learning model (e.g., as compared to conventional techniques). Further, the various embodiments described herein can maintain a customizable nature through the use of the trust parameter ("t") and/or the privacy guarantee value ("ε").

FIG. 6A illustrates a diagram of an example, non-limiting communication scheme 600 that can be implemented by the system 100 in accordance with one or more embodiments described herein. Repetitive description of like elements employed in other embodiments described herein is omitted for sake of brevity. As shown in FIG. 6A, the communication scheme 600 can be implemented in a federated learning environment comprising N number of computer entities 106. Additionally, each computer entity 106 can comprise and/or otherwise have access to one or more second memories 124, which can store a respective dataset 130 (e.g., represented by "$D_N$" in FIG. 6A) and/or decryption key 404 (e.g., a secret key represented by "$sk_N$" in FIG. 6A). In various embodiments, the correspondence between the aggregator component 108 and the compute entities 106 can be facilitated by the one or more networks 104.

As shown in FIG. 6A, the aggregator component 108 (e.g., via the query component 112) can send one or more queries (e.g., represented by "Q") to the computer entities 106 regarding a machine learning algorithm. The computer entities 106 (e.g., via the one or more machine learning components 122) can compute the one or more queries based on data comprised within the respective datasets 130 to generate a response. For example, a first computer entity 106 shown in FIG. 6A can compute the query based on dataset $D_1$, while a second computer entity 106 shown in FIG. 6A can compute the query based on dataset $D_2$.

Further, the computer entities 106 can implement one or more privacy processes (e.g., via the privacy components 202) and/or cryptography processes (e.g., via the cryptography components 204) to modify and/or protect the generated responses. For example, the computer entities 106 can implement one or more differential privacy processes to add noise to the one or more responses and/or implement one or more encryption processes to encrypt the one or more responses. Thereby, the computer entities 106 can generate encrypted modified responses (e.g., represented by "$R'_N$"). For instance, the encrypted modified responses can be characterized by Equation 3 below.

$$R'_N = \text{Enc}_{pk}(R_N + \text{noise}(\varepsilon, t)) \quad (3)$$

Wherein "pk" can represent a public encryption key, and "$R_N$" can represent the respective responses generated by the machine learning components 122 based on the respective datasets 130 (e.g., represented by "$D_N$" in FIG. 6A). Each computer entity 106 can generate a respective encrypted modified response and send the respective encrypted modified response to the aggregator component 108. For example, a first computer entity 106 shown in FIG. 6A can generate a first encrypted modified response (e.g., represented by "$R'_1$" in FIG. 6A) based on dataset $D_1$, while a second computer entity shown in FIG. 6A can generate a second encrypted modified response (e.g., represented by "$R'_2$" in FIG. 6A) based on dataset $D_2$.

Further, the computer entities 106 can send the encrypted modified responses to the aggregator component 108, whereupon the aggregator component 108 (e.g., via response component 302) can aggregate the encrypted modified responses to generate an encrypted response composition (e.g., represented by "$R'_C$" in FIG. 6A). For instance, the encrypted response composition can be characterized by Equation 4 below.

$$R'_C = R'_1 \circ R'_2 \ldots \circ R'_N \quad (4)$$

Wherein "$\circ$" can be an operator that represents the aggregation of responses. In one or more embodiments, the computer entities 106 can be queried for gradients, and $R'_C$ can be computed using a weighted average of the responses. In some embodiment, a decision tree model can be trained, and $R'_C$ can aggregates the class counts provided by computer entities 106 for both before and after splitting their respective data according to each potential feature and computes the information gain for each attribute based on these class counts. Additionally, the aggregator component 108 can send the encrypted response composition to a subset of the computer entities 106 for decryption. For example, FIG. 6A depicts a first computer entity 106 (e.g., the far left computer entity 106) and another computer entity 106 (e.g., the far right computer entity 106) being queried by the aggregator component 108 to decrypt portions of the encrypted response composition, while a second computer entity 106 (e.g., the center computer entity 106) is not included in the decryption process.

The subset of computer entities 106 can decrypt respective portions of the encrypted response composition using the respective decryption keys 404. For example, the first computer entity 106 can partially decrypt the encrypted response composition using the first secret key $sk_1$, and another computer entity 106 can decrypt another portion of the encrypted response composition using another secret key $sk_N$. The subset of computer entities 106 can implement one or more decryption processes (e.g., via the decryption component 402) to generate one or more decrypted portions (e.g., represented by $R''_N$) of the encrypted response composition. For instance, the one or more decrypted portions can be characterized by Equation 5 below.

$$R''_N = \text{Dec}_{sk_N}(R') \quad (5)$$

Additionally, the computer entities 106 can send the decrypted portions to the aggregator component 108, whereupon the aggregator component 108 (e.g., via the model component 502) can synthesize and/or train one or more machine learning models using the data comprised within the decrypted portions. In various embodiments, the aggregator component 108 (e.g., via the model component 502) can synthesize and/or train numerous types of machine learning models (e.g., decision tree models, convolution neural network models, and/or support vector machine models).

FIG. 6B illustrates an example, non-limiting scheme 602 that can facilitate implementing one or more data privacy schemes in the federated learning environment of system 100 in accordance with one or more embodiments described herein. Repetitive description of like elements employed in other embodiments described herein is omitted for sake of brevity. As shown in FIG. 6B, "ML" can represent machine learning, the data parties can be the computer entities 106, the private datasets can be datasets 130, the secret key can be decryption keys 404, "Q" can represent a generated query, "s" can represent a sensitivity (e.g., associated with a subject query), and/or "M" can represent a machine learning model.

FIGS. 7A-7D illustrate diagrams of example, non-limiting graphs that can demonstrate the efficacy of the system 100 by synthesizing and/or training an exemplary decision tree machine learning model in accordance with one or more embodiments described herein. Repetitive description of like elements employed in other embodiments described herein is omitted for sake of brevity.

For example, FIGS. 7A-7D regard an exemplary scenario in which each dataset 130 (e.g., owned by some computer entity 106 of the system 100) contains a set of instances described by the same set of categorical features and a class attribute. The aggregator component 108 can initialize a decision tree machine learning model with a root node. Then, the feature that maximizes information gain (e.g., represented herein by "F") can be chosen based on counts queried from each computer entity 106 and branch nodes can be generated (e.g., via the aggregator component 108, such as via model component 502) for each possible value of F, whereupon F can then be removed from the set of categorical features. This process can continue recursively for each branch node until there are no more features in the set, or the responses (e.g., generated by the computer entities 106) are too noisy to be deemed meaningful.

In various embodiments, the generated queries can be counts or class_counts. To generate the queries, the aggregator component 108 can first divide the privacy guarantee value (e.g., represented herein by "$\varepsilon$") equally between each layer of the subject decision tree being synthesized. At least because different nodes within the same layer can be evaluated on disjoint subsets of the datasets 130, they can avoid accumulation of privacy loss and thereby the privacy guarantee allocated to a single layer is not divided further. Within each node, half of the privacy guarantee can be allocated to determining total counts and half can be allocated to determining class counts (e.g., represented herein by epsilon 1 "$\varepsilon_1$"). For internal nodes, each feature can be evaluated for potential splitting and the privacy guarantee can be divided amongst each feature (e.g., represented herein by epsilon 2 "$\varepsilon_2$").

In the exemplary scenario characterized by FIGS. 7A-7D, the Nursery dataset from the UCI Machine Learning Repository was utilized. The Nursery dataset contains 8 categorical attributes and about 12,960 nursery school applications. The target attribute has five distinct classes with the following distribution: 33.333%, 0.015%, 2.531%, 32.917%, and 31.204%.

In order to provide context for the decision tree machine learning model achieved by the system 100, two different random baselines and two conventional federated learning environments were utilized for comparison. Random baselines enable the identification of when a particular approach is no longer learning meaningful information while the conventional federated learning environments facilitate visualization of relative performance costs. The four baselines used were: uniform guess (e.g., class predictions are randomly sampled with a defined chance for each class), random guess (e.g., improves upon uniform guess by considering class value distribution in the training data), local differential privacy (e.g., parties add noise to protect the privacy of their own data in isolation), and no privacy (e.g., executing the machine learning algorithm without a privacy guarantee and/or privacy measures).

Figure 7A:
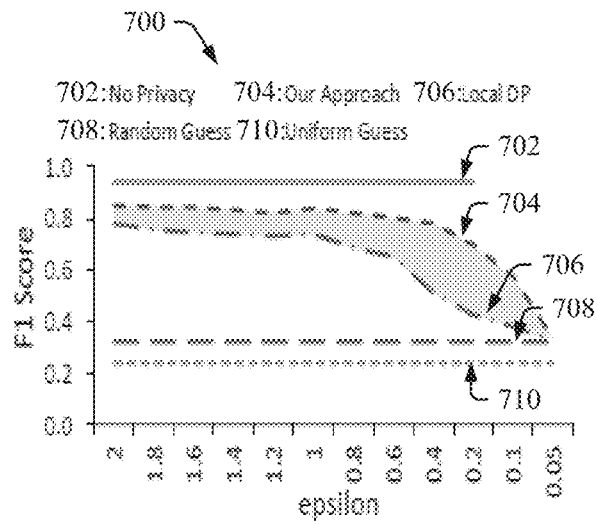
FIG. 7A illustrates a diagram of an example, non-limiting graph that can demonstrate the efficacy of one or more systems that can build one or more machine learning models in a private federated learning environment in accordance with one or more embodiments described herein.

As described herein, a user of the system 100 can define a plurality of settings. Graph 700 of FIG. 7A depicts the impact of adjusting the privacy guarantee. To isolate the impact of the privacy guarantee, the number of computer entities 106 (e.g., data parties) was set to 10 and no collusion was assumed. Privacy guarantee values between 0.05 and 2.0 were considered. As shown in FIG. 7A; line 702 represents the results of the no privacy baseline, line 704 represents the results achieved by the system 100, line 706 represents the results of the local differential privacy baseline, line 708 represents the results of the random guess baseline, and line 710 represents the results of the uniform guess baseline. Graph 700 demonstrates that system 100 can maintain an F1-score above 0.8 for privacy guarantee values as small as 0.4. An F-1 score measures the model accuracy by considering both model precision as well as recall. Once the privacy guarantee value is less than 0.4, the added noise can begin to overwhelm the information be provided, which can have one of two outcomes: learning can end, or inaccurate learning can occur. Either outcome can result in degraded performance of the decision tree machine learning model as the privacy guarantee value decreases. It is evident from graph 700 that the system 100 can achieve improved performance over the conventional federated learning environments (e.g., as demonstrated when the privacy guarantee value decreases from 1.0 to 0.4).

Figure 7B:
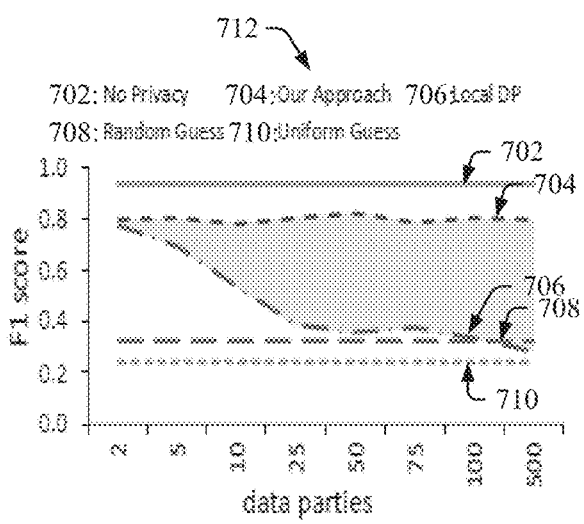
FIG. 7B illustrates a diagram of an example, non-limiting graph that can demonstrate the efficacy of one or more systems that can build one or more machine learning models in a private federated learning environment in accordance with one or more embodiments described herein.

Graph 712 of FIG. 7B depicts the impact of adjusting the number of computer entities 106 (e.g., and/or thereby the number of non-colluding computer entities 106) within the federated learning environment. The results shown in graph 712 regard a fixed privacy guarantee value of 0.5 and no collusion assumed. Additionally, the overall training dataset was divided equally amongst the computer entities 106. As shown in graph 712, as the number of computer entities 106 increases, the amount of noise added by the local differential privacy approach increases proportionally. In contrast system 100 can maintain consistent accuracy even as the number of non-colluding computer entities 106 increases. Graph 712 demonstrates the viability of system 100 in highly distributed environments while also highlighting the shortcomings of the differential privacy approach. For example, with as few as 25 computer entities 106, the local differential privacy approach can begin to approach the baseline and even fall below the random guessing approach by 100 computer entities 106.

Figure 7C:
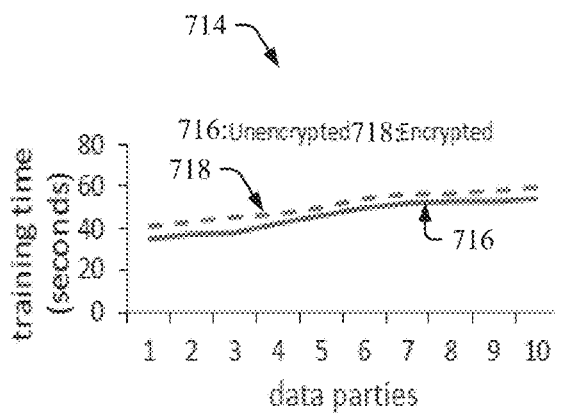
FIG. 7C illustrates a diagram of an example, non-limiting graph that can demonstrate the efficacy of one or more systems that can build one or more machine learning models in a private federated learning environment in accordance with one or more embodiments described herein.

Graph 714 of FIG. 7C depicts the impact that the one or more encryption processes have on the overall training time achieved by system 100 as the number of computer entities 106 increase from 1 to 10. As shown in graph 714; line 716 can represent the results of embodiments that do not incorporate the one or more encryption processes described herein, and line 718 can represent the results of embodiments that incorporate the one or more encryption processes described herein. Graph 714 demonstrates that the overhead of the one or more encryption processes can remain constant as the number of computer entities 106 in the system 100 increases. For example, each computer entity 106 can encrypt query responses (e.g., and/or decrypt encrypted response compositions) in parallel due to the various features of system 100 described herein.

Figure 7D:
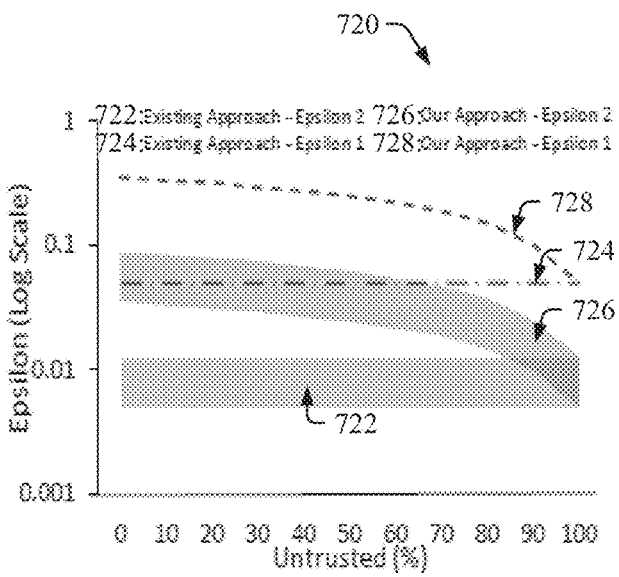
FIG. 7D illustrates a diagram of an example, non-limiting graph that can demonstrate the efficacy of one or more systems that can build one or more machine learning models in a private federated learning environment in accordance with one or more embodiments described herein.

Graph 720 of FIG. 7D can demonstrate how the privacy guarantee values used for both count and distribution queries can impact a trust parameter setting when the system 100 comprises 50 computer entities 106. As shown in FIG. 7D; a first shaded area 722 can represent results achieved by conventional approaches with regards to epsilon 2, line 724 can represent results achieved by conventional approaches with regards to epsilon 1, a second shaded area 726 can represent results achieved by system 100 with regards to epsilon 2, and/or line 728 can represent results achieved by the system 100 with regards to epsilon 1. Wherein all the computer entities 106 are colluding, the results achieved by the system 100 can converge with conventional local differential privacy approaches. In all other scenarios the query epsilon values achieved by the system 100 can lead to more accurate outcomes than conventional approaches.

Figure 8A:
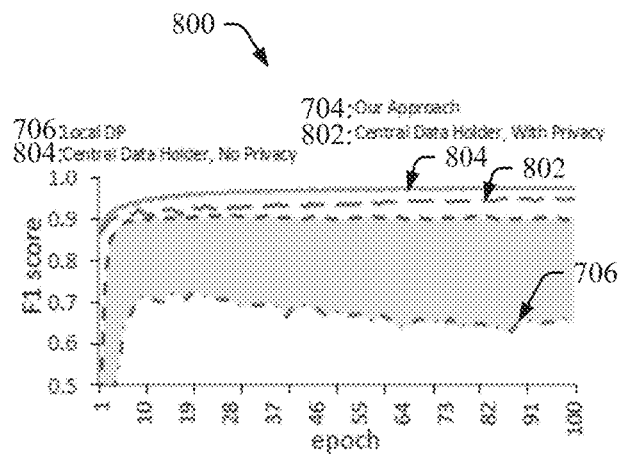
FIG. 8A illustrates a diagram of an example, non-limiting graph that can demonstrate the efficacy of one or more systems that can build one or more machine learning models in a private federated learning environment in accordance with one or more embodiments described herein.
Figure 8B:
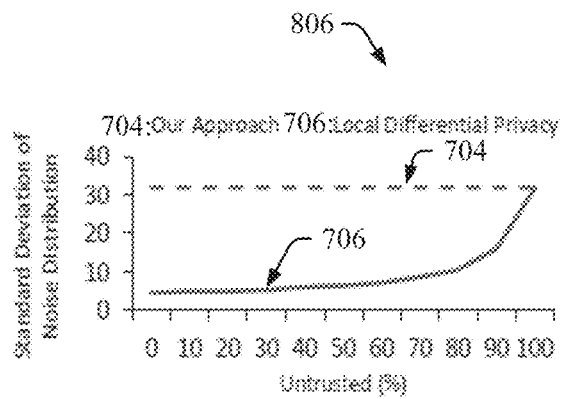
FIG. 8B illustrates a diagram of an example, non-limiting graph that can demonstrate the efficacy of one or more systems that can build one or more machine learning models in a private federated learning environment in accordance with one or more embodiments described herein.

FIGS. 8A-8B illustrate diagrams of example, non-limiting graphs that can demonstrate the efficacy of the system 100 by synthesizing and/or training an exemplary convolutional neural network ("CNN") machine learning model in accordance with one or more embodiments described herein. Repetitive description of like elements employed in other embodiments described herein is omitted for sake of brevity. For example, FIGS. 8A-8B can demonstrate that the system 100 can be utilized to train a distributed differentially private CNN.

Similarly to centrally trained CNNs, each computer entity 106 can be sent (e.g., via the aggregator component 108) a model with the same initial structure and randomly initialized parameters. Each computer entity 106 can then conduct one full epoch of learning locally (e.g., via the one or more machine learning components 122). At the conclusion of each batch, Gaussian noise can be introduced (e.g., via the privacy components 202) to the norm clipping value and the privacy parameter. Norm clipping can enable a bound on the sensitivity of the gradient update. Once an epoch is completed, the final parameters can be sent back to the aggregator component 108, which can then average the parameters and send an updated model to the computer entities 106 for another epoch of learning. After a defined number of epochs, the final CNN machine learning model can be outputted.

To derive FIG. 8A and/or 8B, the publicly available MNIST dataset was used, which includes 60,000 training instances of handwritten digits and 10,000 testing instances. Each example comprised within the dataset is a 28×28 grey-scale image of a digit between 0 and 9. Additionally, the CNN models achieved by the system 100 can be feed-forward models with 2 internal layers of ReLu units and a softmax layer of 10 classes with cross-entropy loss. The first layer can contain 60 units and the second layer can contain 1000 units. Additionally, a norm clipping of 4.0, a learning rate of 0.1, and a batch rate of 0.01 was used with the Keras and a Tensorflow backend. To demonstrate the efficacy of the CNN achieved by system 100, the following three baselines were used as a comparison: central data hold, no privacy (e.g., all the data is centrally held by one party and no privacy is considered in the learning process), central data holder, with privacy (e.g., all the data is centrally held by one party, which conducts privacy-preserving learning), and/or local differential privacy (e.g., parties add noise to protect the privacy of their own data in isolation).

Graph 800 of FIG. 8A regards an instance of 10 computer entities 106 conducting 100 epochs of training with a privacy parameter set to 8.0 and a privacy guarantee value of 0.5. As shown in FIG. 8A; line 802 represents results achieved by the central data holder, with privacy baseline, and/or line 804 represents results achieved by the central data holder, no privacy baseline. As shown in graph 800, the system 100 can achieve an F1-score of 0.9; thereby significantly outperforming conventional local differential privacy approaches, which only achieve an F1-score of 0.723. Graph 806 of FIG. 8B depicts the degree of noise in the subject CNN training with varying rates of trust. Graph 806 demonstrates that the standard deviation of noise can be significantly decreased by the system 100 for most scenarios.

Figure 8C:
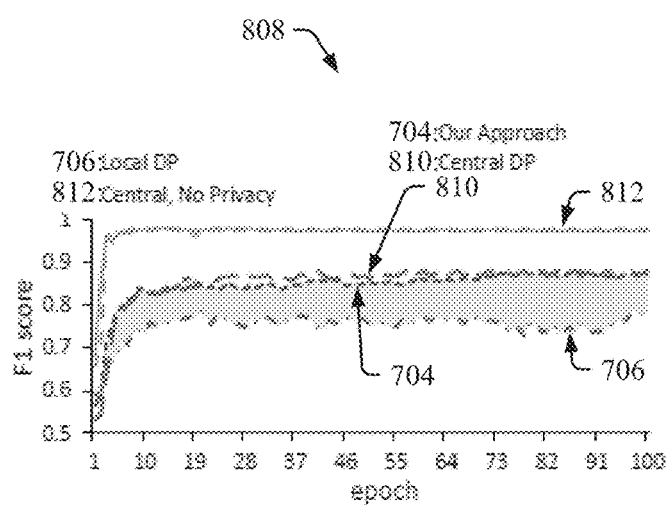
FIG. 8C illustrates a diagram of an example, non-limiting graph that can demonstrate the efficacy of one or more systems that can build one or more machine learning models in a private federated learning environment in accordance with one or more embodiments described herein.

FIG. 8C illustrate a diagram of example, non-limiting graph that can demonstrate the efficacy of the system 100 by synthesizing and/or training an exemplary support vector machine ("SVM") machine learning model in accordance with one or more embodiments described herein. Repetitive description of like elements employed in other embodiments described herein is omitted for sake of brevity. For example, the system 100 can used to solve a classic $l_2$-regularized binary linear SVM problem with hinge loss.

For example, an SVM can be trained in a private distributed fashion, wherein the aggregator component 108 can distribute a machine learning model with the same weight vector to all computer entities 106. Each computer entity 106 can run (e.g., via the one or more machine learning components 122) a defined number of epochs to learn locally. To apply differential privacy in this setting (e.g., via the privacy components 202), a norm clipping can be performed on the feature vector to obtain a bound on the sensitivity of the gradient update. Then, Gaussian noise can be added to the gradient. After each computer entity 106 completes the local training, the final noisy encrypted weights can be sent back to the aggregator component 108. The aggregator component 108 can average the encrypted weights and send back to the computer entities 106 an updated machine learning model with a new weight vector for another epoch of learning. Training can end after a defined number of epochs.

To derive FIG. 8C, the publicly available "gisette" dataset was used, which includes 6,000 training samples and 1,000 testing samples with 5,000 features. To demonstrate the efficacy of the CNN achieved by system 100, the following three baselines were used as a comparison: central, no privacy (e.g., centrally trained model without privacy), central differential privacy (e.g., centrally trained model with differential privacy), and local differential privacy (e.g., each party adds enough noise independently to protect their data). Additionally, the learning rate was set to 0.01 for all settings and 100 epochs were used for all approaches. Further, for the federated learning approaches, each computer entity 106 ran 10 epochs locally and there were 10 computer entities 106, which were non-colluding.

Graph 808 of FIG. 8C demonstrates that the system 100 can achieve an F1-score over 0.87, which is almost equal to central differential privacy, significantly out-performing conventional federated learning approaches (e.g., local differential privacy) after 100 epochs. As shown in graph 808; line 810 can represent results achieved by the central differential privacy approach, and line 812 can represent results achieved by the central, no privacy approach. Additionally, when trusting half of the parties, the system 100 can out-perform local differential privacy. Specifically, after 100 epochs, the system 100 can reach a 0.85 F1-score, while the local differential privacy approach only achieves a F1-score of 0.75.

Figure 9:
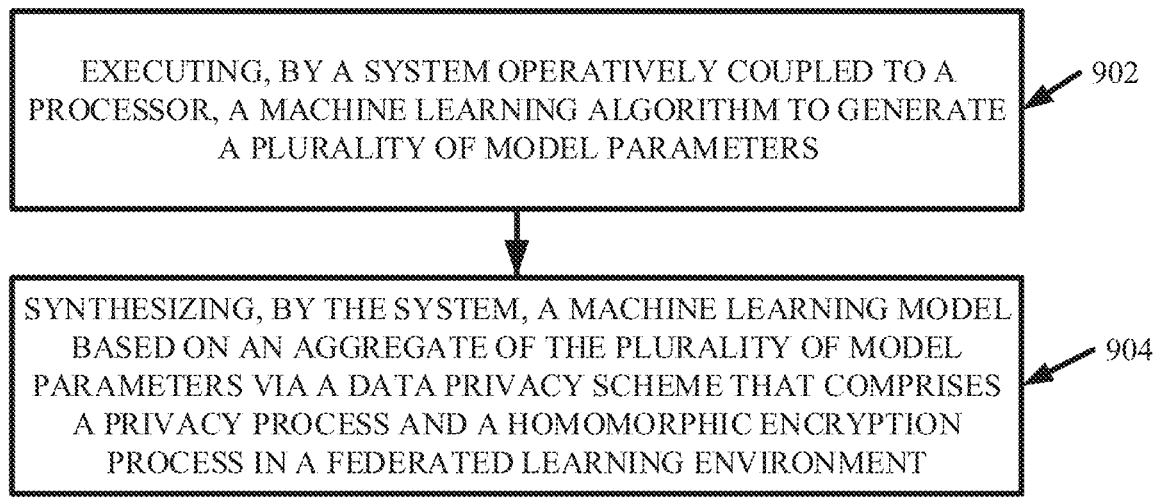
FIG. 9 illustrates a flow diagram of an example, non-limiting method that can facilitate building one or more machine learning models in a private federated learning environment in accordance with one or more embodiments described herein.

FIG. 9 illustrates a flow diagram of an example, non-limiting method 900 that can facilitate implementing a system 100 that can preserve data privacy in a federated learning environment in accordance with one or more embodiments described herein. Repetitive description of like elements employed in other embodiments described herein is omitted for sake of brevity.

At 902, the method 900 can comprise executing, by a system 100 operatively coupled to one or more processors (e.g., first processor 118 and/or second processor 128), one or more machine learning algorithms to generate a plurality of model parameters. For example, the executing at 902 can be facilitated by the query component 112 of the aggregator component 108 and/or the one or more machine learning components 122 of the one or more computer entities 106, as described herein. For instance, the query component 112 can generate one or more queries regard a machine learning algorithm to be computed by the one or more machine learning components 122. The one or more machine learning components 122 can further generate the data as one or more responses to the one or more queries based on training data comprised within one or more datasets 130. As described herein, the one or more datasets 130 can be held in confidence by a respective computer entity 106.

At 904, the method can also comprise synthesizing, the by the system 100, one or more machine learning models based on an aggregate of the plurality of model parameters via one or more data privacy schemes that can comprise one or more privacy processes and/or homomorphic encryption processes in a federated learning environment. For example, the one or more data privacy schemes can be facilitated by the one or more privacy components 202, cryptography components 204, response component 302, and/or decryption component 402. For instance, the one or more privacy components 202 can implement the one or more privacy processes, which can include, but are not limited to: an anonymization process, a randomization process, a differential privacy process, a suppression process, a generalization process, an aggregation or grouping of data, a combination thereof, and/or the like.

The one or more cryptography processes can comprise an encryption of one or more generated data (e.g., via the cryptography component 204) and/or a threshold variant homomorphic encryption processes (e.g., via the response component 302 and/or one or more decryption components 402) to aggregate and/or decrypt the generated data. For example, the generated data can be encrypted, whereupon the encrypted data can be aggregated, and the aggregated encrypted data can be disseminated to a subset of the parties within the federated learning environment (e.g., a subset of the computer entities 106) for decryption. Further, the decryption can be implemented by the subset of parties using secret decryption keys (e.g., decryption keys 404) that correlated to portions of the aggregated encrypted data. In one or more embodiments, method 900 can be facilitated by communication scheme 600. Additionally, the one or more machine learning models can be of various types, such as decision tree models, CNN models, and/or SVM models.

Advantageously, various embodiments described herein can combine one or more differential privacy processes and/or secure multiparty computations within a federated learning environment to improve the accuracy of machine learning models while preserving one or more privacy guarantees and/or protecting against extraction and/or collusion threats. Additionally, the various features of the system 100 and/or method 900 described herein can ensure overall privacy from inference of the one or more outputted machine learning models and/or any intermediate result made available to the aggregator component 108 and/or a computer entity 106.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
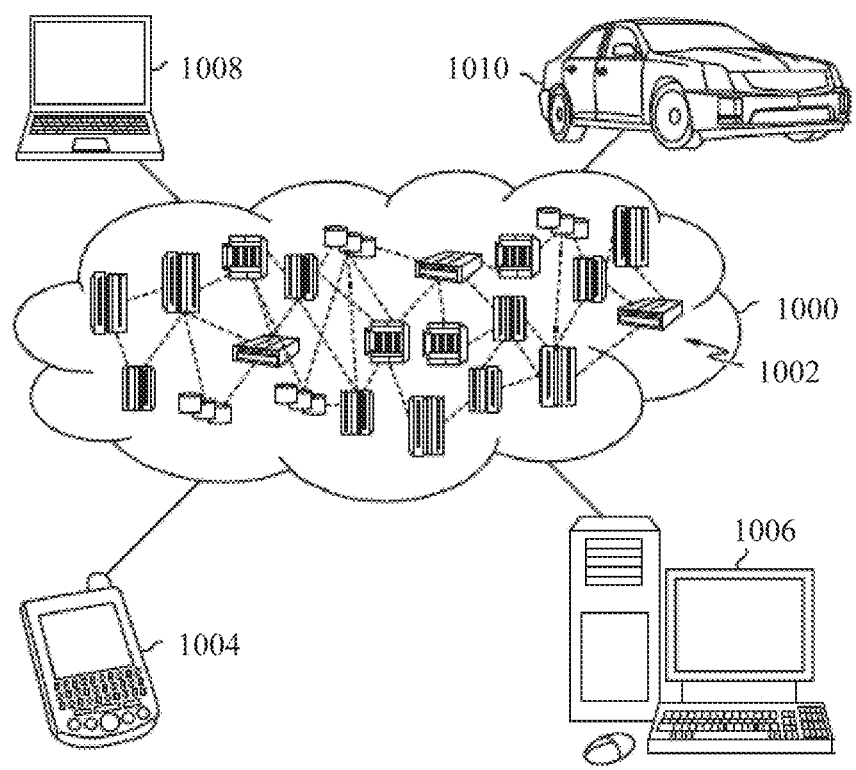
FIG. 10 depicts a cloud computing environment in accordance with one or more embodiments described herein.

Referring now to FIG. 10, illustrative cloud computing environment 1000 is depicted. As shown, cloud computing environment 1000 includes one or more cloud computing nodes 1002 with which local computing devices used by cloud consumers, such as, for example, personal digital assistant (PDA) or cellular telephone 1004, desktop computer 1006, laptop computer 1008, and/or automobile computer system 1010 may communicate. Nodes 1002 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1004-1010 shown in FIG. 10 are intended to be illustrative only and that computing nodes 1002 and cloud computing environment 1000 can communicate with any type of computerized device over any type of network and/or network addressable connection (e.g., using a web browser).

Figure 11:
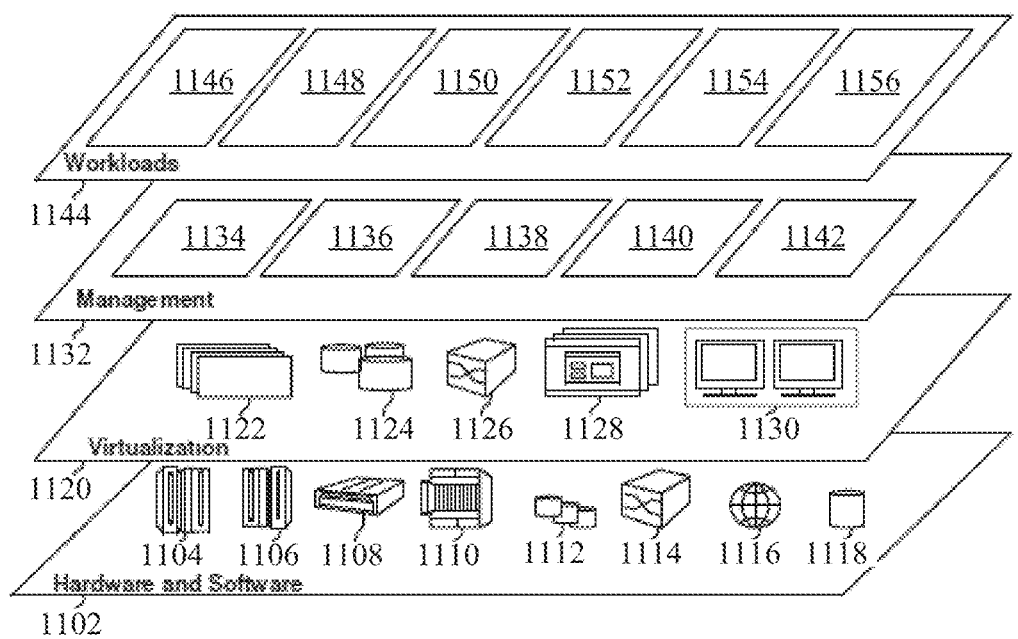
FIG. 11 depicts abstraction model layers in accordance with one or more embodiments described herein.

Referring now to FIG. 11, a set of functional abstraction layers provided by cloud computing environment 1000 (FIG. 10) is shown. Repetitive description of like elements employed in other embodiments described herein is omitted for sake of brevity. It should be understood in advance that the components, layers, and functions shown in FIG. 11 are intended to be illustrative only and embodiments of the invention are not limited thereto. As depicted, the following layers and corresponding functions are provided.

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and federated learning 1156. Various embodiments of the present invention can utilize the cloud computing environment described with reference to FIGS. 10 and 11 to implement one or more data privacy schemes within a federated learning environment, as described herein.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 12:
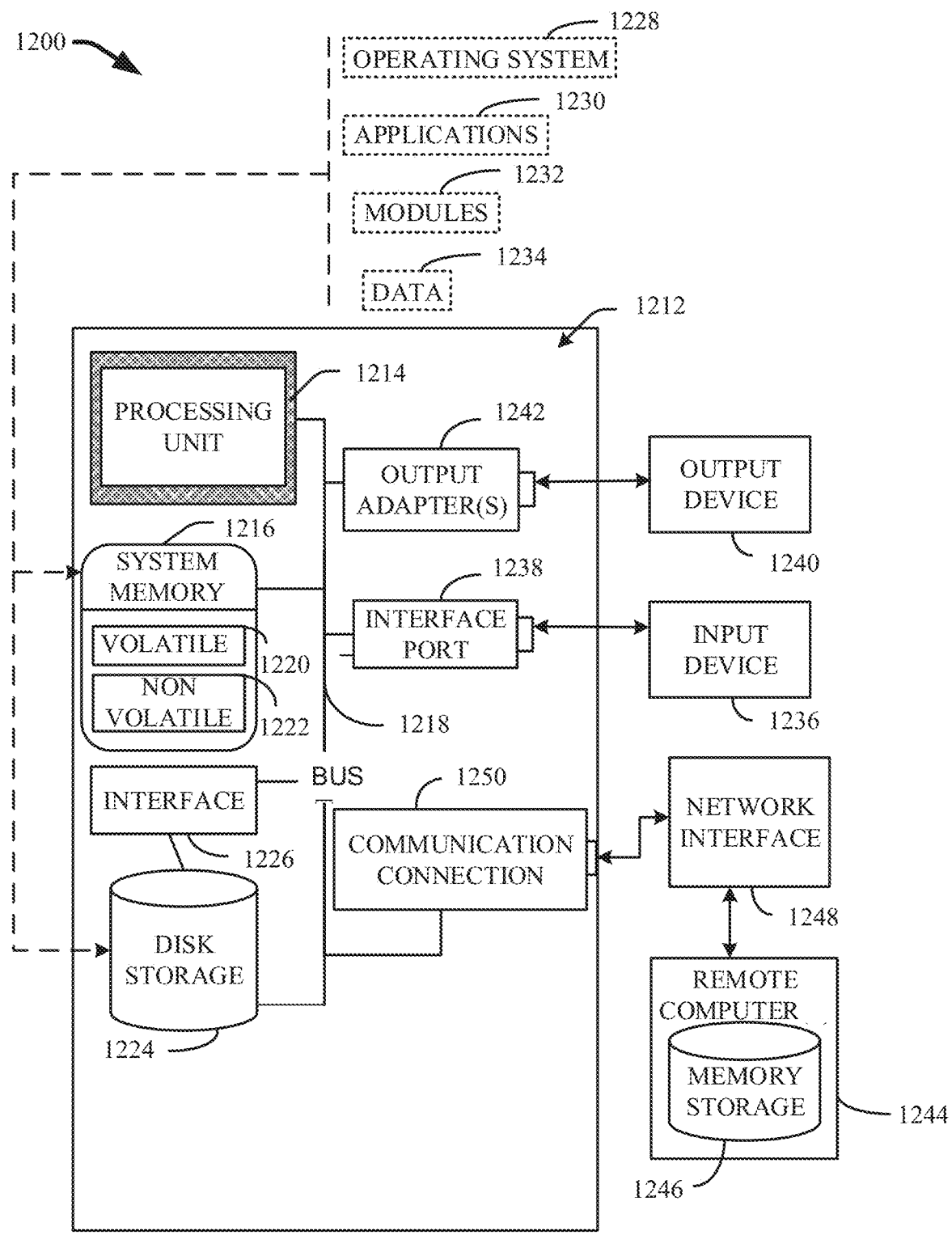
FIG. 12 illustrates a block diagram of an example, non-limiting operating environment in which one or more embodiments described herein can be facilitated.

In order to provide a context for the various aspects of the disclosed subject matter, FIG. 12 as well as the following discussion are intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity. With reference to FIG. 12, a suitable operating environment 1200 for implementing various aspects of this disclosure can include a computer 1212. The computer 1212 can also include a processing unit 1214, a system memory 1216, and a system bus 1218. The system bus 1218 can operably couple system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structures including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire, and Small Computer Systems Interface (SCSI). The system memory 1216 can also include volatile memory 1220 and nonvolatile memory 1222. The basic input/output system (BIOS), containing the basic routines to transfer information between elements within the computer 1212, such as during start-up, can be stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media. FIG. 12 illustrates, for example, a disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface can be used, such as interface 1226. FIG. 12 also depicts software that can act as an intermediary between users and the basic computer resources described in the suitable operating environment 1200. Such software can also include, for example, an operating system 1228. Operating system 1228, which can be stored on disk storage 1224, acts to control and allocate resources of the computer 1212. System applications 1230 can take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems. A user enters commands or information into the computer 1212 through one or more input devices 1236. Input devices 1236 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices can connect to the processing unit 1214 through the system bus 1218 via one or more interface ports 1238. The one or more Interface ports 1238 can include, for example, a serial port, a parallel port, a game port, and a universal serial bus (USB). One or more output devices 1240 can use some of the same type of ports as input device 1236. Thus, for example, a USB port can be used to provide input to computer 1212, and to output information from computer 1212 to an output device 1240. Output adapter 1242 can be provided to illustrate that there are some output devices 1240 like monitors, speakers, and printers, among other output devices 1240, which require special adapters. The output adapters 1242 can include, by way of illustration and not limitation, video and sound cards that provide a means of connection between the output device 1240 and the system bus 1218. It should be noted that other devices and/or systems of devices provide both input and output capabilities such as one or more remote computers 1244.

Computer 1212 can operate in a networked environment using logical connections to one or more remote computers, such as remote computer 1244. The remote computer 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer 1244. Remote computer 1244 can be logically connected to computer 1212 through a network interface 1248 and then physically connected via communication connection 1250. Further, operation can be distributed across multiple (local and remote) systems. Network interface 1248 can encompass wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). One or more communication connections 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

Embodiments of the present invention can be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device including, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components including a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   one or more memories that store computer executable components;
   one or more processors, operably coupled to the one or more memories, and that execute the computer executable components stored in the one or more memories, wherein the computer executable components comprise:
      a plurality of machine learning components that execute a machine learning algorithm to generate a plurality of model parameters; and
      an aggregator component that synthesizes a machine learning model based on an aggregate of the plurality of model parameters, wherein the aggregator component communicates with the plurality of machine learning components via a data privacy scheme that comprises a privacy process and a homomorphic encryption process in a federated learning environment,
         wherein the plurality of machine learning components are comprised within a plurality of computer entities, and wherein a computer entity from the plurality of computer entities further comprises:
            a privacy component that modifies training data by implementing the privacy process to generate modified training data, wherein a machine learning component from the plurality of machine learning components generates a model parameter from the plurality of model parameters based on the modified training data as a response to a query from the plurality of queries; and
            a cryptography component that encrypts the response by implementing the homomorphic encryption process to generate an encrypted response.

2. The system of claim 1, wherein the aggregator component further distributes the aggregate of the plurality of model parameters amongst the plurality of machine learning components within the federated learning environment.

3. The system of claim 1, wherein the privacy process includes at least one member selected from a group consisting of: an anonymization process, a randomization process, a differential privacy process, a suppression process, and a generalization process, and wherein the homomorphic encryption process is a threshold variant homomorphic encryption process.

4. The system of claim 1, further comprising:
   a query component that generates a plurality of queries regarding the machine learning algorithm and sends the plurality of queries to the plurality of machine learning components, wherein the plurality of machine learning components are within the federated learning environment.

5. The system of claim 4, wherein the plurality of machine learning components are comprised within a plurality of computer entities, wherein a computer entity from the plurality of computer entities generates a model parameter from the plurality of model parameters as a response to the plurality of queries, and wherein the computer entity further comprises:
   a privacy component that modifies the response by implementing the privacy process to generate a modified response; and
   a cryptography component that encrypts the modified response by implementing the homomorphic encryption process to generate an encrypted response.

6. The system of claim 5, wherein the privacy component adds noise to the response based on at least one member selected from a group consisting of: a privacy guarantee parameter, a number of the plurality of computer entities that are non-colluding parties, and a number of queries comprised within the plurality of queries.

7. The system of claim 5, further comprising:
a response component that generates an encrypted response composition based on the encrypted response and a second encrypted response, and wherein the response component sends the encrypted response composition to a subset of the plurality of computer entities.

8. The system of claim 7, wherein computer entities comprised within the subset generate decrypted portions of the encrypted response composition using secret decryption keys, and wherein the aggregator component aggregates the decrypted portions to derive the aggregate of the plurality of model parameters.

9. A computer-implemented method, comprising:
executing, by a system operatively coupled to a processor, a machine learning algorithm to generate a plurality of model parameters; and
synthesizing, by the system, a machine learning model based on an aggregate of the plurality of model parameters via a data privacy scheme that comprises a privacy process and a homomorphic encryption process in a federated learning environment;
generating, by the system, a model parameter from the plurality of model parameters as a response to a query from a plurality of queries;
modifying, by the system, the response by implementing the privacy process to generate a modified response; and
encrypting, by the system, the modified response by implementing the homomorphic encryption process to generate an encrypted response.

10. The computer-implemented method of claim 9, wherein the homomorphic encryption process is a threshold variant homomorphic encryption process, and wherein the privacy process includes at least one member selected from a group consisting of an anonymization process, a randomization process, a suppression process, a generalization process, and a differential privacy process.

11. The computer-implemented method of claim 9, further comprising:
generating, by the system, the plurality of queries regarding the machine learning algorithm; and
communicating, by the system, the plurality of queries to a plurality of computer entities comprised within the federated learning environment.

12. The computer-implemented method of claim 9, further comprising:
generating, by the system, an encrypted response composition based on the encrypted response and a second encrypted response; and
communicating, by the system, the encrypted response composition to a subset of the plurality of computer entities.

13. The computer-implemented method of claim 12, further comprising:
generating, by the system, decrypted portions of the encrypted response composition using a plurality of secret decryption keys respectively held by computer entities comprised within the subset; and
aggregating, by the system, the decrypted portions to derive the aggregate of the plurality of model parameters.

14. A computer program product for performing private federated learning, the computer program product comprising a computer readable storage medium having program instructions embodied therewith, the program instructions executable by a processor to cause the processor to:
execute, by a system operatively coupled to the processor, a machine learning algorithm to generate a plurality of model parameters;
synthesize, by the system, a machine learning model based on an aggregate of the plurality of model parameters via a data privacy scheme that comprises a privacy process and a homomorphic encryption process in a federated learning environment;
generate, by the system, a model parameter from the plurality of model parameters as a response to a query from the plurality of queries;
modify, by the system, the response by implementing the privacy process to generate a modified response; and
encrypt, by the system, the modified response by implementing the homomorphic encryption process to generate an encrypted response.

15. The computer program product of claim 14, wherein the federated learning environment is facilitated by a cloud computing technology.

16. The computer program product of claim 14, where the program instructions further cause the processor to:
generate, by the system, the plurality of queries regarding the machine learning algorithm; and
communicate, by the system, the plurality of queries to a plurality of computer entities within the federated learning environment.

17. The computer program product of claim 16, wherein the program instructions further cause the processor to:
generate, by the system, an encrypted response composition based on the encrypted response and a second encrypted response generated by the plurality of computer entities;
communicate, by the system, the encrypted response composition to a subset of the plurality of computer entities to generate decrypted portions of the encrypted response composition; and
aggregate, by the system, the decrypted portions to derive the aggregate of the plurality of model parameters.

* * * * *